US010399441B2

(12) United States Patent
Tao

(10) Patent No.: US 10,399,441 B2
(45) Date of Patent: Sep. 3, 2019

(54) DIGITAL LOAD MANAGEMENT FOR VARIABLE OUTPUT ENERGY SYSTEMS

(71) Applicant: Meng Tao, Fountain Hills, AZ (US)

(72) Inventor: Meng Tao, Fountain Hills, AZ (US)

(73) Assignee: Arizona Board of Regents on behalf of Arizona State University, Scottsdale, AZ (US)

(*) Notice: Subject to any disclaimer, the term of this patent is extended or adjusted under 35 U.S.C. 154(b) by 140 days.

(21) Appl. No.: 15/350,171

(22) Filed: Nov. 14, 2016

(65) Prior Publication Data

US 2017/0133854 A1 May 11, 2017

Related U.S. Application Data

(60) Provisional application No. 62/373,041, filed on Aug. 10, 2016, provisional application No. 62/253,754, filed on Nov. 11, 2015.

(51) Int. Cl.

| | |
|---|---|
| *H02J 3/38* | (2006.01) |
| *B60L 11/18* | (2006.01) |
| *H02J 13/00* | (2006.01) |
| *H02J 1/14* | (2006.01) |
| *H02J 7/35* | (2006.01) |
| *B60L 53/30* | (2019.01) |

(Continued)

(52) U.S. Cl.
CPC ........... *B60L 11/1803* (2013.01); *B60L 53/30* (2019.02); *B60L 53/51* (2019.02); *B60L 53/63* (2019.02); *H02J 1/14* (2013.01); *H02J 7/35* (2013.01); *H02J 7/0027* (2013.01); *Y02E 60/721* (2013.01); *Y02T 10/7005* (2013.01); *Y02T 10/7094* (2013.01); *Y02T 10/92* (2013.01); *Y02T 90/121* (2013.01); *Y02T 90/128* (2013.01); *Y02T 90/14* (2013.01); *Y02T 90/163* (2013.01); *Y04S 10/126* (2013.01)

(58) Field of Classification Search
CPC . B60L 11/1803; H02J 1/14; H02J 7/35; H02J 7/0027
See application file for complete search history.

(56) References Cited

U.S. PATENT DOCUMENTS

| | | |
|---|---|---|
| 4,511,807 A | 4/1985 | Somerville |
| 4,571,532 A | 2/1986 | Jaster |

(Continued)

OTHER PUBLICATIONS

Hansen, Anca Daniela; Sørensen, Poul Ejnar; Hansen, L.H.; Bindner, Henrik W., Models for a Stand-Alone PV system, 2001, Denmark. Forskningscenter Risoe. Risoe-R, No. 1219(EN), 0106-2840, Technical University of Denmark.

(Continued)

*Primary Examiner* — Rexford N Barnie
*Assistant Examiner* — Elim Ortiz
(74) *Attorney, Agent, or Firm* — Snell & Wilmer, L.L.P.

(57) ABSTRACT

Principles of the present disclosure present a new concept for solar photovoltaic systems wherein the load to the photovoltaic system is digitally managed. This allows for much higher system efficiency along with a much lower system cost as compared to traditional solar photovoltaic systems in specific applications. By eliminating storage and power electronics typically present in traditional solar photovoltaic systems, exemplary systems achieve a cost reduction of over 50%, while the system efficiency is improved to over 95%.

8 Claims, 6 Drawing Sheets

(51) Int. Cl.
*B60L 53/63* (2019.01)
*B60L 53/51* (2019.01)
*H02J 7/00* (2006.01)

(56) References Cited

U.S. PATENT DOCUMENTS

| | | | |
|---|---|---|---|
| 5,293,447 A * | 3/1994 | Fanney | F24D 19/1057 |
| | | | 136/248 |
| 5,635,816 A | 6/1997 | Welsh et al. | |
| 6,037,758 A | 3/2000 | Perez | |
| 6,624,350 B2 | 9/2003 | Nixon | |
| 6,889,122 B2 | 5/2005 | Perez | |
| 2010/0017045 A1 * | 1/2010 | Nesler | B60L 11/1824 |
| | | | 700/296 |
| 2010/0207448 A1 | 8/2010 | Cooper et al. | |
| 2010/0264732 A1 * | 10/2010 | Beck | H02J 7/35 |
| | | | 307/24 |
| 2014/0265573 A1 * | 9/2014 | Kreutzman | F24H 1/0018 |
| | | | 307/31 |
| 2016/0376712 A1 * | 12/2016 | Ono | C25B 1/10 |
| | | | 204/230.5 |

OTHER PUBLICATIONS

Nishad Mendis, Kashem Muttaqi, Saad Sayeef, Sarath Perera, Autonomous Operation of Wind-Battery Hybrid Power System with Maximum Power Extraction Capability, 2010, pp. 1-7, 2010 International Conference on Power System Technology (POWERCON).
Robert S. Balog, Autonomous Local Control in Distributed DC Power Systems, Dissertation, 2006, Department of Electrical and Computer Engineering, University of Illinois at Urbana-Champaign.
Nahidul Hoque Samrat, Norhafizan Ahmad, Imtiaz Ahmed Choudhury, Zahari Taha, Technical Study of a Standalone Photovoltaic—Wind Energy Based Hybrid Power Supply Systems for Island Electrification in Malaysia, PLOS ONE, Jun. 29, 2015, 10(6): e0130678.
J. Faxas-Guzmán, R. García-Valverde, L. Serrano-Luján, A. Urbina, Priority Load Control Algorithm for Optimal Energy Management in Stand-Alone Photovoltaic Systems, Renewable Energy, Jan. 26, 2014, vol. 68, pp. 156-162, 0960-1481, Elsevier Ltd. 2014.

\* cited by examiner

DIGITAL LOAD MANAGEMENT FOR VARIABLE OUTPUT ENERGY SYSTEMS

CROSS-REFERENCE TO RELATED APPLICATIONS

This application claims priority to, and the benefit of, U.S. Provisional Application Ser. No. 62/253,754 filed on Nov. 11, 2015 and entitled "DIGITAL LOAD MANAGEMENT FOR SOLAR PHOTOVOLTAIC SYSTEMS". This application also claims priority to, and the benefit of, U.S. Provisional Application Ser. No. 62/373,041 filed on Aug. 10, 2016 and entitled "DIGITAL LOAD MANAGEMENT FOR SOLAR PHOTOVOLTAIC SYSTEMS". Each of the foregoing applications is hereby incorporated by reference in its entirety for all purposes.

TECHNICAL FIELD

The present disclosure relates to renewable energy such as solar power, and in particular to intelligent control of loads driven by solar power.

BACKGROUND

Renewable energy systems, for example solar power systems, often generate power intermittently, for example based on varying cloud cover and other conditions. This inherent variability can lead to significant inefficiencies in utilizing these systems. Accordingly, improved systems and approaches for managing and utilizing renewable energy, for example, solar power, wind power, wave power, and/or the like, remain desirable.

BRIEF DESCRIPTION OF THE DRAWINGS

With reference to the following description and accompanying drawings.

DETAILED DESCRIPTION

Figure 1:
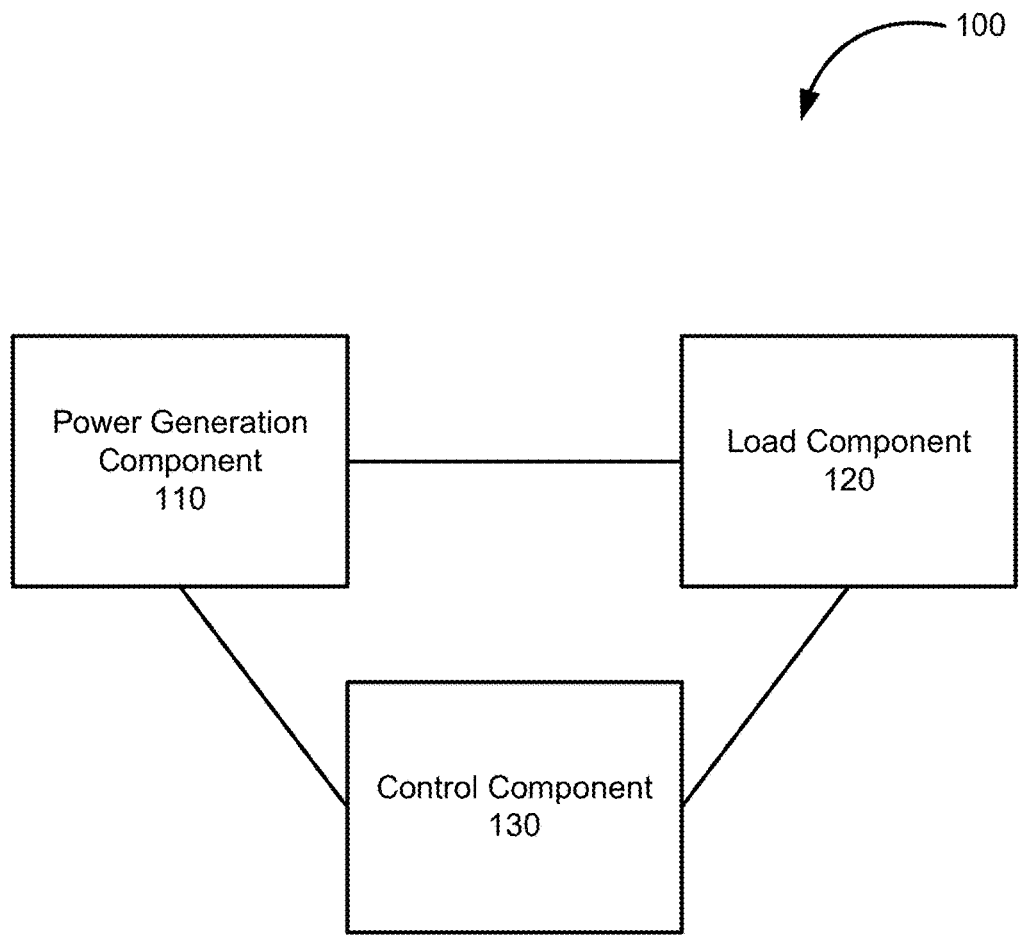
FIG. 1 illustrates an exemplary energy management system in accordance with an exemplary embodiment.

The following description is of various exemplary embodiments only, and is not intended to limit the scope, applicability or configuration of the present disclosure in any way. Rather, the following description is intended to provide a convenient illustration for implementing various embodiments including the best mode. As will become apparent, various changes may be made in the function and arrangement of the elements described in these embodiments without departing from principles of the present disclosure.

For the sake of brevity, conventional techniques for photovoltaic cell construction and use, as well as conventional approaches for electricity generation, storage, use, and/or the like may not be described in detail herein. Furthermore, the connecting lines shown in various figures contained herein are intended to represent exemplary functional relationships and/or physical couplings between various elements. It should be noted that many alternative or additional functional relationships or physical connections may be present in a practical load-managing controller for photovoltaics and/or method for utilizing intermittent electricity, for example electricity generated by a photovoltaic system.

It will be appreciated that, while exemplary embodiments disclosed herein are directed to solar photovoltaic systems, principles of the present disclosure may be applied to various intermittent power generation technologies, such as wind power, wave power, and/or the like. All such intermittent power generation technologies are considered to fall within the scope of the present disclosure.

A well-known feature of solar photovoltaic systems is their intermittency, i.e. they are generally not capable of providing a stable or even predictable power output. This presents a significant challenge in many applications, as electrical and electronic systems are typically designed to utilize a stable electricity supply from the grid. To address this difficulty, various storage technologies have been utilized to smooth out the output from solar systems (for example, batteries, pumped hydropower, flywheels, and/or the like). Storage devices increase the cost of solar systems, in some cases doubling or even tripling the system cost. They also reduce the system efficiency, as there are energy losses (for example, in the case of batteries, in the conversion from electricity to chemical energy and then back to electricity).

Another common feature of solar photovoltaic systems is that they are typically connected to the grid. For utility-scale systems, the grid provides transmission for the large quantity of electricity to different locations. Residential and commercial solar photovoltaic systems often serve as supplemental electricity while the grid is the backup. If the supply from a grid-coupled solar photovoltaic system surpasses the associated demand, the excess electricity can be fed into the grid. Sophisticated power electronics are typically utilized to match the output of solar photovoltaic systems with the input of the grid, and to allow electricity to flow in both directions. Again, the system cost goes up and the system efficiency comes down in connection with operation of the power electronics.

Prior approaches for utilizing solar photovoltaic systems took the position that intermittent power should be conditioned, managed, or backed up to match the demand. While this may be true in many applications, it makes solar photovoltaic systems more complicated due to the need to utilize costly storage devices and power electronics. Each time power is conditioned or managed, an associated power loss is incurred. The more power managing or conditioning needed, generally, the lower the system efficiency.

In contrast to these and other shortcomings of prior approaches, principles of the present disclosure contemplate use of load management in connection with variable power generation. In contrast to prior approaches directed to management of the power supply, principles of the present disclosure contemplate management of the demand. Stated another way, in various exemplary embodiments a load-managing controller manages the load connected to a solar photovoltaic system in order to more closely match the load with the intermittent power generated by the solar photovoltaic system. An important advantage of such a load-managing controller is: the solar photovoltaic system becomes much more efficient by eliminating power managing or conditioning. The savings in system cost are equally noticeable, as the system requires neither storage devices nor power electronics. In various exemplary embodiments, a load-managing controller involves largely microelectronics. Principles of the present disclosure may be utilized in various fields, for example charging of electric vehicles, operation of pumps for agricultural irrigation, industrial electrolysis (for example, electrowinning, hydrogen production from water, electrorefining, and/or the like).

Principles of the present disclosure contemplate load management concepts, for example for solar photovoltaic systems with intermittent power output. With reference now to FIG. 1, in an exemplary embodiment a power generation system 100 comprises a power generation component 110, a load component 120, and a control component 130. Power generation component 110 may comprise a solar voltaic system, a wind power system, a hydropower system, a wave power system, and/or the like. Power generation component 110 delivers electrical energy to load component 120.

Load component 120 may comprise loads configured to accept and utilize electrical energy delivered from power generation component 110. Load component 120 may comprise a series of sub-loads which may be of equal size or of varying sizes. Loads in load component 120 may be of a fixed value; alternatively, loads in load component 120 may be of a variable or adjustable level.

Control component 130 is coupled to power generation component 110 and load component 120. Control component 130 is configured to increase and/or decrease the effective value of load component 120 presented to power generation component 110, so as to make improved and/or optimal use of electrical power generated by power generation component 110. For example, control component 130 may adjust a variable characteristic of load component 120 in order to better match load component 120 to power generation component 110. Alternatively, control component 130 may connect and/or disconnect a fixed (or variable) sub-load as part of load component 120 in order to better match load component 120 to power generation component 110.

Figure 2A:
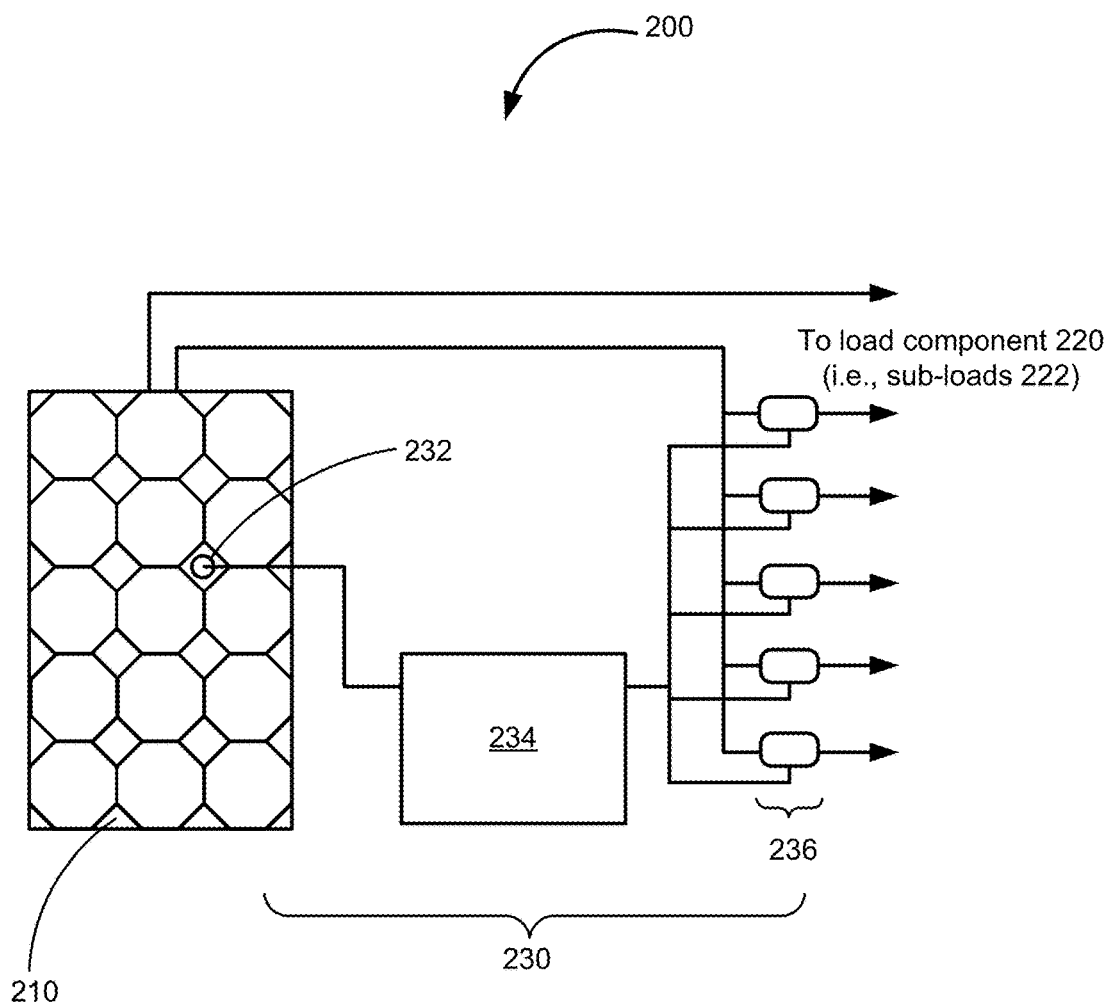
FIG. 2A illustrates a solar photovoltaic system utilizing a load-managing controller in accordance with an exemplary embodiment.
Figure 2B:
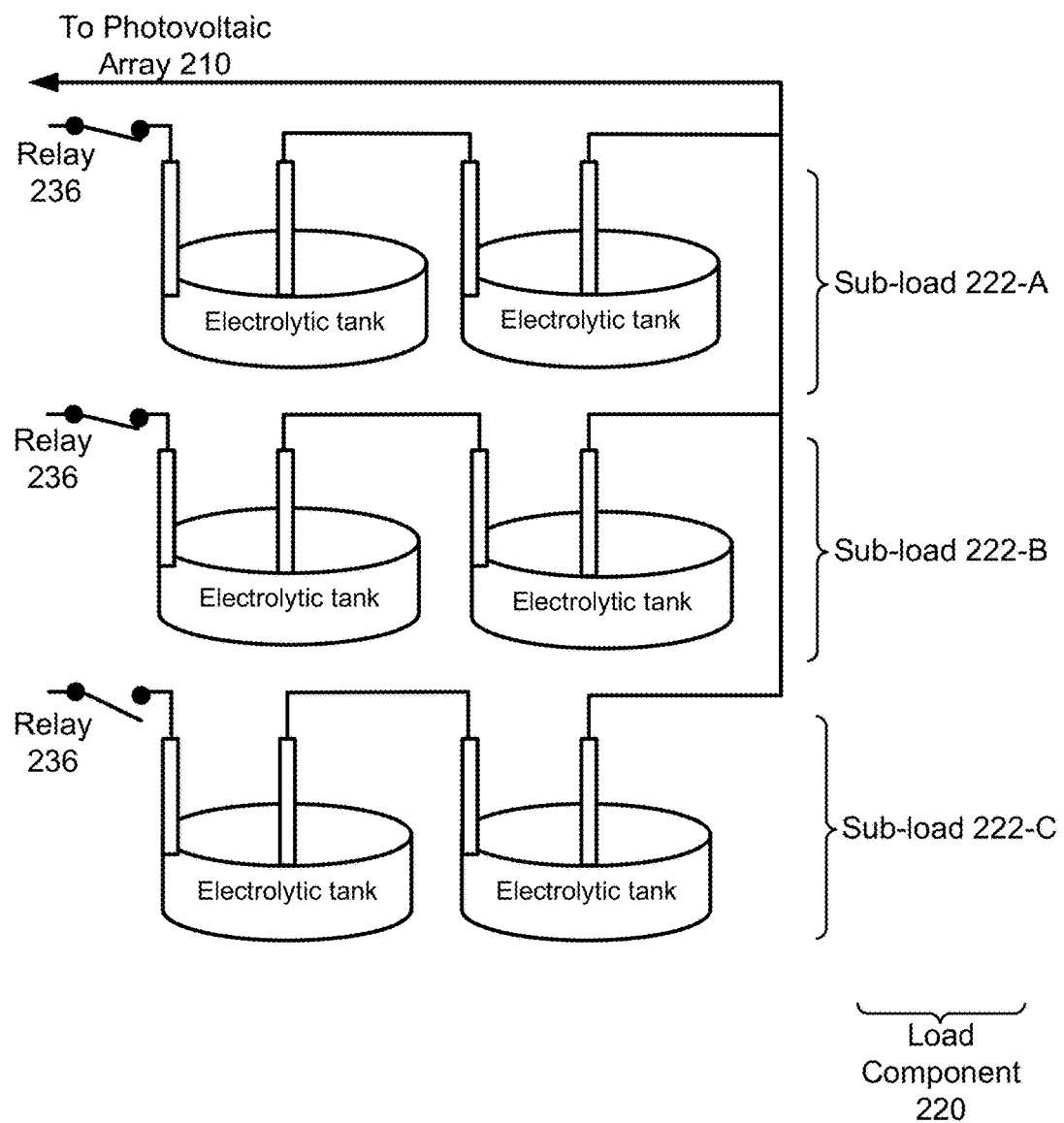
FIG. 2B illustrates load management for solar photovoltaic systems in accordance with an exemplary embodiment.

With reference now to FIGS. 2A and 2B, in an exemplary load management system 200 where load component 220 is configured with fixed load resistances, in order to perform efficiently it is desirable that load component 220: A) is divided or divisible into multiple smaller loads or sub-loads 222 (for example, multiple pumps in an irrigation system, multiple electrolytic tanks in industrial electrolysis, or the like); and B) the sub-loads 222 comprising load component 220 are able to tolerate frequent power-on and power-off as needed. It will be appreciated that many applications are poorly suited to the above constraints, however, appropriate applications fitting within the foregoing constraints may see significant efficiency improvements via application of principles of the present disclosure.

With continued reference to FIGS. 2A and 2B, in system 200, an exemplary control component 130, for example load-managing controller 230, comprises:

A) a photodetector 232 configured to measure the instantaneous power output of an associated photovoltaic system, for example photovoltaic array 210. Photodetector 232 may be a photovoltaic solar cell attached to photovoltaic array 210; alternatively, any suitable device or technique for measuring the instantaneous power output of a variable power generation system may be utilized.

B) a processor or processors 234 (for example, a programmable logic controller (PLC), a microcontroller, a desktop computer, tablet, smartphone, embedded system, and/or the like). Processor 234 is configured to control the effective value of load component 220 as seen by photovoltaic array 210 (for example, processor 234 controls associated relays according to the instantaneous power monitored by photodetector 232).

C) multiple relays 236 which are controlled by processor 234, for example based on the instantaneous power reported by photodetector 232. Each relay 236 is operative to couple and uncouple an associated sub-load 222 in load component 220 to photovoltaic array 210.

Load-managing controller 230 may be configured to implement any suitable algorithm and/or methodology to determine when a particular sub-load 222 should be coupled to and/or uncoupled from photovoltaic array 210. For example, in an exemplary embodiment wherein system 200 is configured with six sub-loads 222, controller 230 may activate a first relay 236 when the solar intensity on photovoltaic array 210 reaches 12.5% of maximum, a second relay 236 at 25% of maximum, third at 37.5%, fourth at 50%, fifth at 62.5%, and sixth at 75%. As the solar intensity decreases, controller 230 may implement the process in reverse, deactivating the relays 236 at corresponding percentages of maximum solar intensity, thus deactivating the last relay 236 and uncoupling the last sub-load 222 when the solar intensity on photovoltaic array 210 falls below 12.5%. However, any suitable algorithm may be utilized.

Load-managing controller 230 typically consumes a small amount of power (for example, in hundreds of milliamperes and tens of volts), which is typically significantly smaller than the power output from photovoltaic array 210. In addition, power from photovoltaic array 210 does not go through load-managing controller 230 for conditioning or managing before being delivered to load component 220. Instead, load-managing controller 230 controls the number of sub-loads 222 connected to photovoltaic array 210. It will be appreciated that exemplary principles are illustrated in FIG. 2B using three rows of electrolytic tanks acting as sub-loads 222 as an example; however, the principles disclosed herein can be applied to any suitable number and/or configuration of sub-loads 222.

In the exemplary embodiment illustrated in FIG. 2B, each row of electrolytic tanks is a sub-load 222 (e.g., 222-A, 222-B, 222-C, etc.). Exemplary features of this load-managing solar photovoltaic system include:

A) The minimum number of sub-loads 222 is two, and the maximum number of sub-loads 222 is governed by processor 234 as it determines the number of relays 236 that may be controlled; B) There is at least one relay 236 for each sub-load 222 to connect or disconnect it from photovoltaic array 210; C) Any number of sub-loads 222, from zero sub-loads 222 to every sub-load 222, can be connected to photovoltaic array 210 at any moment depending on the instantaneous power from photovoltaic array 210; D) All the sub-loads 222, when connected to photovoltaic array 210, are connected in parallel; E) All the sub-loads 222 utilize a common input voltage, which matches the output voltage of the photovoltaic array 210; F) Sub-loads 222 can be electrolytic tanks, pumps, batteries, electric vehicles, or any other suitable electrical machines or systems depending on the particular application; G) Each relay 236 can handle voltages from a few volts to hundreds of volts and currents from a few amperes to thousands of amperes depending on the application and the relays 236 selected; and H) Only a minimal amount of power (and ideally, no power) is wasted on "dump loads" at any time during the operation of the system and all or nearly all power from photovoltaic array 210 goes to useful work.

Operation of system 200 takes into account the principle of solar photovoltaic systems that, when the solar irradiance varies, large changes in the output current occur but much smaller changes in the output voltage occur. In other words, solar photovoltaic systems can be approximated as constant-voltage sources. For example, when the short-circuit current of a typical photovoltaic system drops by a factor of 3, its open-circuit voltage typically only changes by ~0.03 V or ~5%.

Accordingly, in configuring an exemplary system 200, a desirable step is to match (or nearly match) an output voltage of a solar photovoltaic system with an input voltage of the sub-loads. In one exemplary embodiment, photovoltaic array 210 comprises a 60-cell silicon solar module outputting ~30 V. Accordingly, exemplary approaches for voltage matching might include:

A) If each electrolytic tank requires 10 V for operation, it takes three electrolytic tanks in series to add to 30 V. The three serially connected electrolytic tanks form a sub-load 222.

B) If each electrolytic tank requires 12 V for operation, it takes two 60-cell silicon solar modules in series to add to 60 V, which matches five electrolytic tanks in series. The five serial electrolytic tanks are a sub-load 222.

Another desirable step in configuring an exemplary system 200 is to match the peak power of photovoltaic array 210 with the combined power of all the sub-loads 222. For example, if system 200 is configured with three sub-loads 222 at 100 watts (W), 150 watts, and 250 watts, respectively, the combined wattage of all the sub-loads is 100+150+250=500 W. The peak power of photovoltaic array 210 should therefore be about 500 W peak.

Another step in configuring system 200 is to prioritize sub-loads 222 to be connected or disconnected to photovoltaic array 210, i.e. which sub-load 222 should be powered on first or powered off first, which sub-load 222 should be second, third, fourth, and so on until all sub-loads 222 are accounted for. It will be appreciated that, if there is no priority associated with sub-loads 222, one can randomly order sub-loads 222 for connection and disconnection or utilize any other suitable selection process.

Yet another step in configuring system 200 is to determine an appropriate moment to activate (or deactivate) any particular relays 236 which connects (or disconnects) an associated sub-load 222 to photovoltaic array 210. When there is no output from photovoltaic array 210 at night, all relays 236 may be deactivated and none of sub-loads 222 are connected to photovoltaic array 210. When the sun rises, photovoltaic array 210 starts to produce power. When the power is sufficient for operation of the first sub-load 222, the first relay 236 is activated by controller 230 based on the signal level from the photodetector 232 and the first sub-load 222 is powered on.

When photovoltaic array 210 outputs enough power for operation of both the first and second sub-loads 222, the second relay 236 is activated and both the first and second sub-loads 222 are now connected to photovoltaic array 210 in parallel. Over the period of increasing sunlight in the day, some or all sub-loads 222 are, one by one, connected to photovoltaic array 210. As the solar irradiance starts to decrease, controller 230 starts to deactivate relays 236 one by one based on the signal level of photodetector 232 and disconnect sub-loads 222 one by one. When photovoltaic array 210 is no longer producing sufficient power to be useful (for example, at sunset), all sub-loads 222 may be disconnected from photovoltaic array 210.

Figure 3:
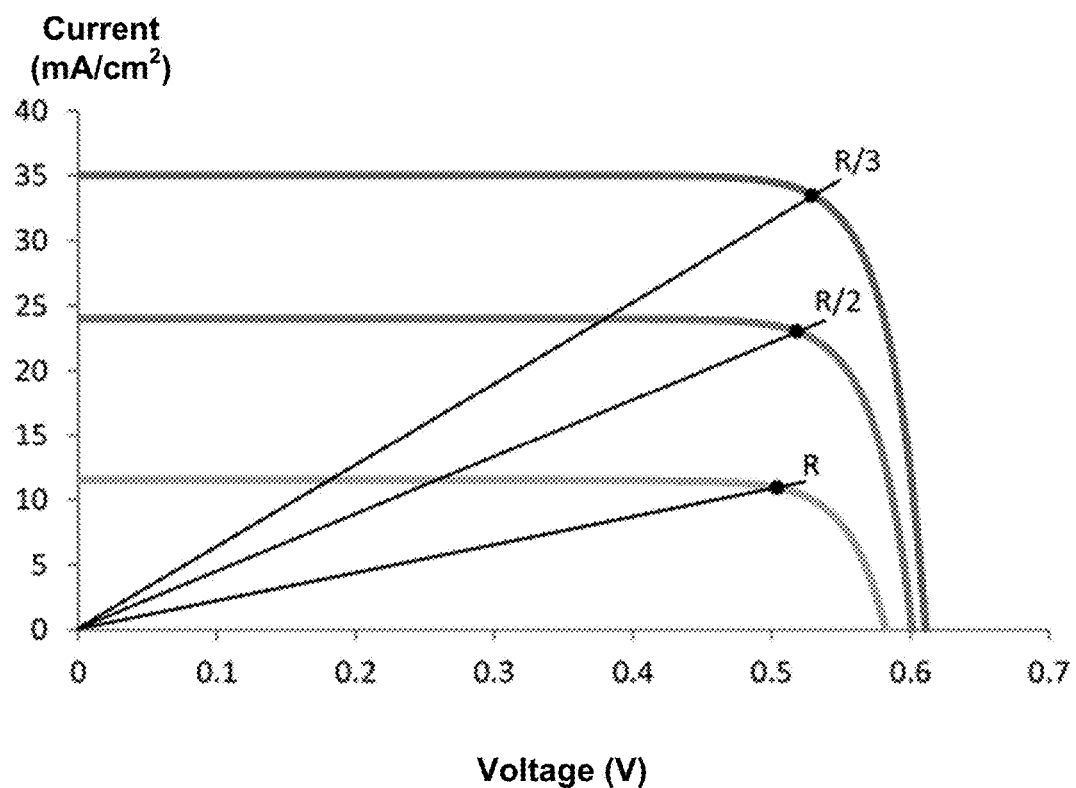
FIG. 3 illustrates a load-line analysis for load-managing solar photovoltaic systems in accordance with an exemplary embodiment.

The high efficiency of system 200 is illustrated by the load-line analysis shown in FIG. 3, in which three identical sub-loads 222 are used as an example showing operation of system 200. A sub-load 222 has a characteristic resistance as determined by its design. For example, the size of, distance between, and other characteristics of the electrodes in an electrolytic tank can be modified to adjust its resistance, as well as the concentration of the electrolyte. When the solar irradiance varies, the characteristic resistance of photovoltaic array 210 changes. The characteristic resistance is high in early mornings and late afternoons when the solar irradiance is low, and is the lowest when the sun is highest in the sky and/or directly overhead when the solar irradiance is the highest. To extract maximum power from photovoltaic array 210, only one sub-load 222 is connected to the photovoltaic system in early mornings and late afternoons. The sub-load 222 is designed such that its resistance matches that of photovoltaic array 210 in early mornings and late afternoons. In late mornings and early afternoons when the resistance of photovoltaic array 210 becomes lower, two sub-loads 222 are connected to photovoltaic array 210 in parallel. This reduces the resistance of the overall effective load by half, providing a better match to the current state of photovoltaic array 210. By the time the sun reaches its zenith, the resistance of photovoltaic array 210 reaches minimum, and all three sub-loads 222 are connected to the photovoltaic system in parallel. The resistance of the overall load now becomes ⅓ of the early morning value, again providing a better match to photovoltaic array 210 at that time.

In accordance with principles of the present disclosure, performance of an exemplary load-managing solar photovoltaic system, for example system 200 may be configured based on the number of sub-loads in the system; the more sub-loads system 200 has, the better the system efficiency as system 200 can match loads to power outputs in a more granular fashion. Moreover, the cost of components operative as controller 230 is typically significantly lower than traditional power conditioning or managing controllers. For example, a programmable logic controller costs ~$100. A small silicon solar cell costs about ~$10. And a 20 A relay costs ~$15. Thus, for ~$200, an exemplary controller with six relays for a 30 V 120 A, i.e. 3600 W peak solar photovoltaic system can be created. To improve the performance of the load-managing solar photovoltaic system, one can add more sub-loads to the system at an expense of about an additional $15 per sub-load for the relay.

Exemplary applications for principles of the present disclosure include, but are not limited to:

1. Many raw materials are produced electrolytically, including caustic soda (produced at ~65,000,000 tons per year), copper (16,000,000 tons per year), zinc (12,000,000 tons per year), and many others at smaller quantities. In these cases, hundreds of electrolytic tanks are operated simultaneously. The tanks can be grouped into sub-loads and connected to a huge photovoltaic system through an exemplary load-managing controller as disclosed herein, i.e. the production of these raw materials can be powered completely by solar electricity.

2. Large-scale solar-powered irrigation systems often involve multiple pumps to deliver water to different villages or farms. Each pump can be configured as a sub-load, and they may be connected to a solar photovoltaic system through an exemplary load-managing controller. In this manner, water may be pumped partially and/or completely by solar power.

3. Charging of electric vehicles in a garage by a rooftop solar photovoltaic system can be controlled by an exemplary load-managing controller as disclosed herein. For example, each vehicle may be considered a sub-load, and the controller can decide how many vehicles may be charged at a particular moment, depending on the output power of the associated solar photovoltaic system.

It will be appreciated that, while the examples in FIGS. 2A, 2B, and 3 involved identical sub-loads, i.e. all the sub-loads have the same characteristic resistance, an exemplary load-managing controller can also control a system with different sub-loads, i.e. each sub-load can be a different electrical machine with a different characteristic resistance. For example, in a solar refrigeration system, the sub-loads include a compressor and fans. The compressor is a sub-load. Each fan can be a sub-load, or all the fans can be combined into one sub-load, depending on the system specifications.

Figure 4A:
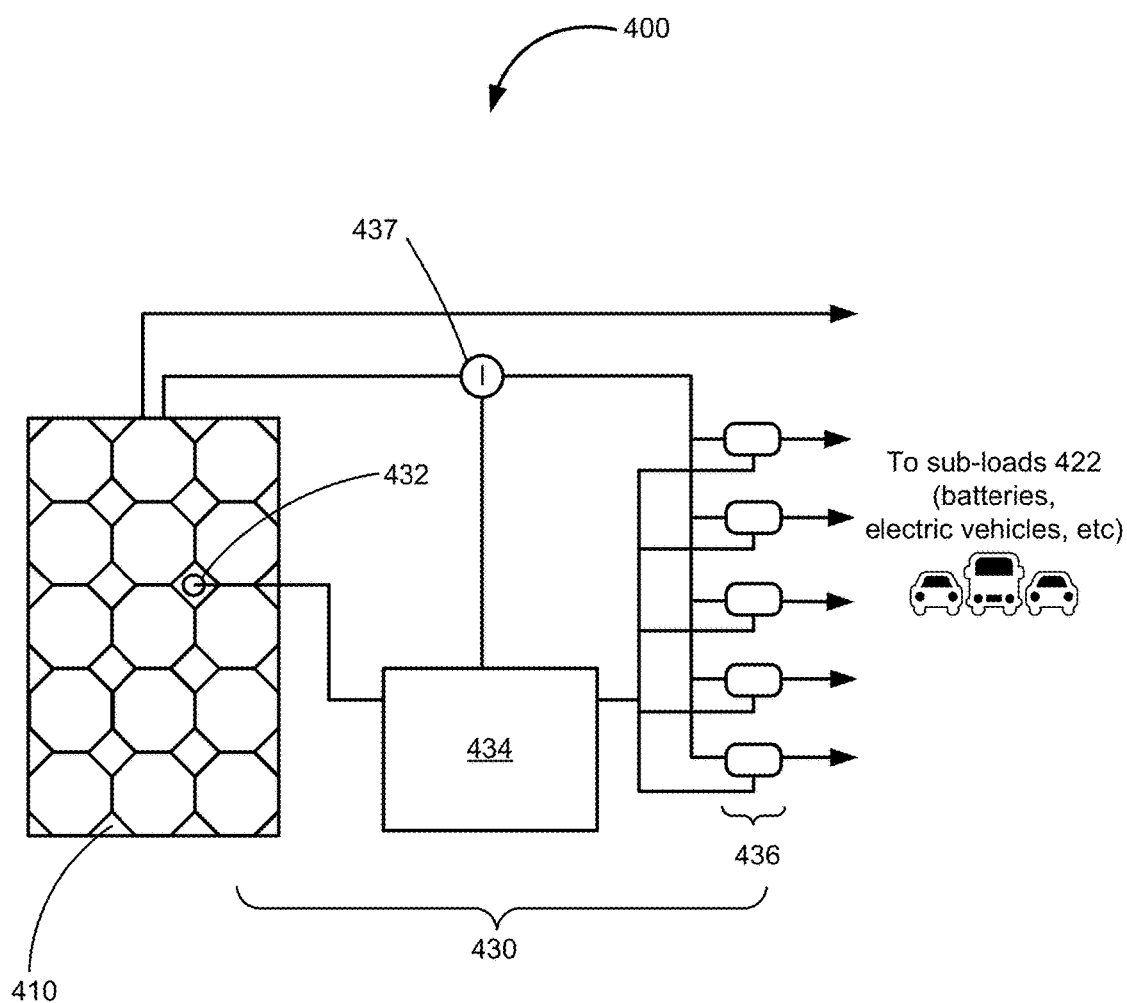
FIG. 4A illustrates a solar photovoltaic system utilizing a load-managing controller and a current sensor in accordance with an exemplary embodiment.
Figure 4B:
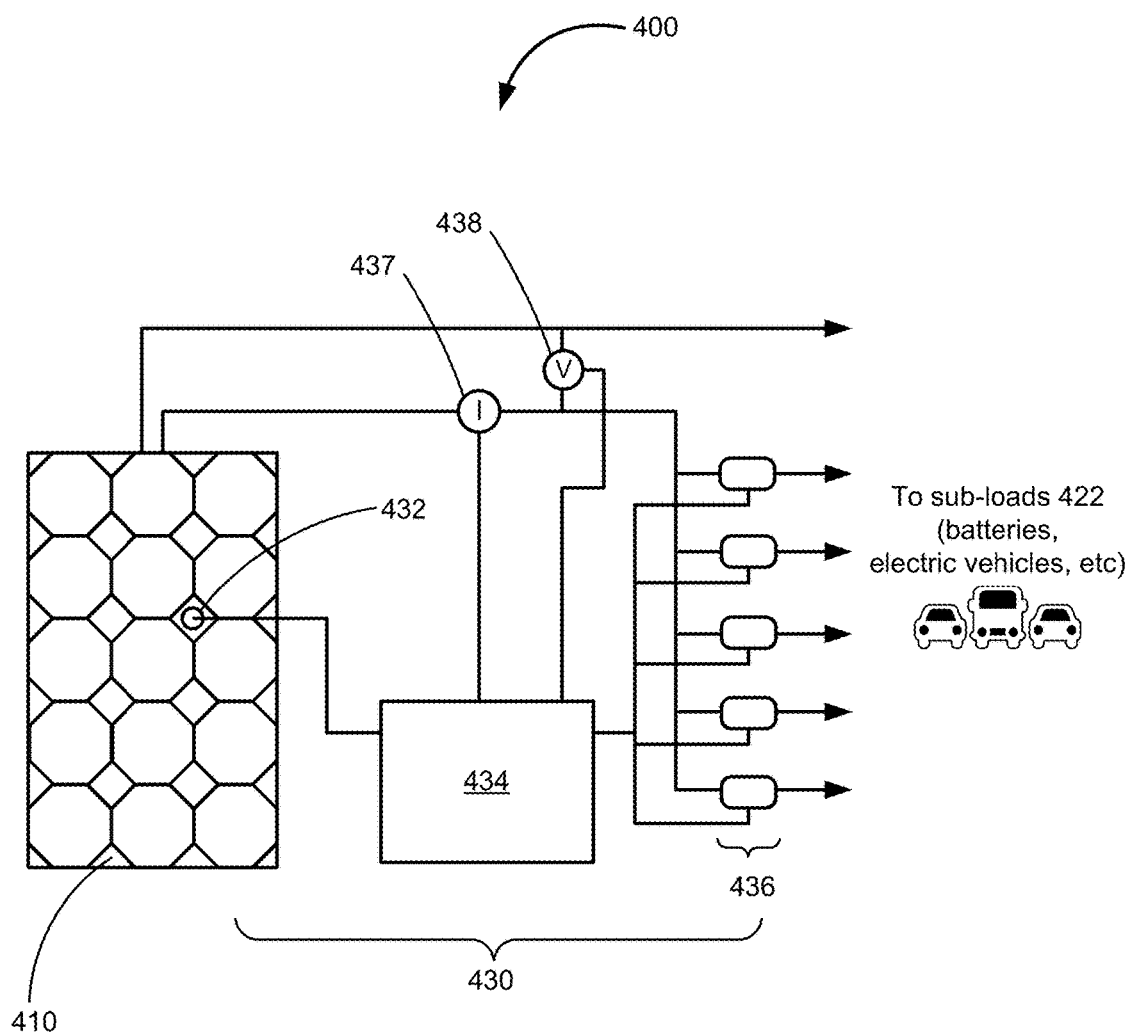
FIG. 4B illustrates a solar photovoltaic system utilizing a load-managing controller, a current sensor, and a voltage sensor in accordance with an exemplary embodiment.

With reference now to FIGS. 4A and 4B, and in contrast to the exemplary systems disclosed in FIGS. 2A, 2B, and 3 which utilized fixed-resistance loads, in various exemplary embodiments an exemplary load-managing solar photovoltaic system 400 may be configured to utilize loads where the resistance of the load is not constant, but instead changes over time. For example, an exemplary system 400 may be configured for use in connection with charging of an electric vehicle, where the charge current is a function of the state of the battery: initial current is high, then tapers as the battery approaches full charge; from the battery perspective, the internal resistance of the battery is lowest when the battery is fully discharged, increases as the battery is charged, and reaches a maximum when the battery is fully charged.

With respect to system 400, two principles applicable to the systems disclosed in FIGS. 2A, 2B, and 3 remain: A) There are multiple sub-loads 422 in system 400, such as multiple electric vehicles or multiple batteries in a photovoltaic charging system; and B) the multiple sub-loads 422 are able to tolerate frequent power-on and power-off as needed.

In these exemplary embodiments, instead of a fixed internal resistance, one or more (or each) of the multiple sub-loads 422 has a variable internal resistance, which changes over time. Accordingly, for a given voltage applied to each of sub-load 422, different current results as a consequence of the varying internal resistance. Therefore, system 400 may be equipped with components and techniques for managing feedback in order to more effectively utilize power generated by solar panel 410.

Various exemplary embodiments of system 400 are configured with two (or more) feedback signals. A first feedback signal comes from photodetector 432 which measures the instantaneous solar power from photovoltaic array 410. A second feedback signal comes from a power sensor which measures the actual power delivered to all the sub-loads 422. These two feedbacks are supplied to processor 434, which determines the difference between the two powers. If the power from photovoltaic array 410 exceeds the power delivered to the currently connected sub-loads 422, controller 430 will connect one more sub-load 422 to photovoltaic array 410. If the power from photovoltaic array 410 is below the power needed to be delivered to the sub-loads 422, controller 430 will disconnect one sub-load 422 from photovoltaic array 410.

A difference between system 200 and system 400 is the number and/or configuration of sensor(s) utilized to measure the actual power being delivered to the associated sub-loads. For example, as illustrated in FIG. 4A, system 400 may be configured with a current sensor 437 configured to measure the total current delivered to the loads. Additionally, as illustrated in FIG. 4B, system 400 may also be configured with a voltage sensor 438 configured to measure the voltage delivered to sub-loads 422. The product of the current and voltage provides the total power delivered to sub-loads 422. Meanwhile, the maximum available power from photovoltaic array 410 is measured by photodetector 432. Controller 430 determines the difference between the two powers. If the power available from photovoltaic array 410 is more than the power currently delivered to sub-loads 422, controller 430 may activate an additional relay 436 and connect one more sub-load 422 to photovoltaic array 410. Alternatively, controller 430 may adjust a characteristic of a particular sub-load 422 to increase the total power delivered to sub-loads 422. Conversely, if the power from photovoltaic array 410 is below the power delivered to sub-loads 422, controller 430 may disconnect one sub-load 422 from photovoltaic array 410 (and/or adjust a characteristic of a particular sub-load 422 to decrease the total power delivered to sub-loads 422).

Because a photovoltaic array has a more constant output voltage than its output current, in certain exemplary embodiments system 400 may be configured absent a voltage sensor and thus simplified as shown in FIG. 4A. Current sensor 437 measures the total current delivered to sub-loads 422; system 400 may be operated on the assumption that the power delivered to sub-loads 422 is proportional to the current measured. Accordingly, in operation of system 400, the power delivered is compared to the maximum available power from photovoltaic array 410. Depending on the relation between the two powers, controller 430 connects or disconnects a sub-load 422 from photovoltaic array 410.

Exemplary load-managing solar photovoltaic system 400 illustrated in FIGS. 4A and 4B may be applied in various applications for solar photovoltaic systems with variable loads. Such applications include, but are not limited to, photovoltaic charging systems for electric vehicles and batteries.

In contrast to prior approaches, exemplary load-managing solar photovoltaic systems have significant advantages. By managing the load instead of the power, storage devices and power electronics are eliminated from load-managing solar photovoltaic systems. This can reduce the cost of traditional solar systems by over 50%. By managing the load, power managing or conditioning is eliminated in load-managing solar photovoltaic systems. This avoids power losses related to power managing or conditioning, enabling higher overall system efficiency, for example efficiencies over 95%.

While the principles of this disclosure have been shown in various embodiments, many modifications of structure, arrangements, proportions, the elements, materials and components, used in practice, which are particularly adapted for a specific environment and operating requirements may be used without departing from the principles and scope of this disclosure. These and other changes or modifications are intended to be included within the scope of the present disclosure.

The present disclosure has been described with reference to various embodiments. However, one of ordinary skill in the art appreciates that various modifications and changes can be made without departing from the scope of the present disclosure. Accordingly, the specification is to be regarded in an illustrative rather than a restrictive sense, and all such modifications are intended to be included within the scope of the present disclosure. Likewise, benefits, other advantages, and solutions to problems have been described above with regard to various embodiments. However, benefits, advantages, solutions to problems, and any element(s) that may cause any benefit, advantage, or solution to occur or become more pronounced are not to be construed as a critical, required, or essential feature or element.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Also, as used herein, the terms "coupled," "coupling," or any other variation thereof, are intended to cover a physical connection, an electrical connection, a magnetic connection, an optical connection, a communicative connection, a functional connection, and/or any other connection. When language similar to "at least one of A, B, or C" or "at least one of A, B, and C" is used in the specification or claims, the phrase is intended to mean any of the following: (1) at least one of A; (2) at least one of B; (3) at least one of C; (4) at least one of A and at least one of B; (5) at least one of B and at least one of C; (6) at least one of A and at least one of C; or (7) at least one of A, at least one of B, and at least one of C.

What is claimed is:

1. A method for managing a solar photovoltaic system, the method comprising:
   measuring, by a photodetector, a power output of a photovoltaic array;
   coupling, responsive to a first signal from a controller and by a first relay, a first sub-load to the photovoltaic array;
   determining, by the controller, the power output of the photovoltaic array exceeds the capacity of the first sub-load;
   coupling, responsive to a second signal from the controller and by a second relay, a second sub-load to the photovoltaic array;
   determining, by the controller, the power output of the photovoltaic array is less than the combined capacity of the first sub-load and the second sub-load; and
   uncoupling, responsive to a third signal from the controller and by the second relay, the second sub-load from the photovoltaic array,
   wherein the power output of the photovoltaic array is not routed through the controller for conditioning or managing prior to being delivered to the first sub-load or the second sub-load, and
   wherein the power output of the photovoltaic array is delivered to the first sub-load and the second sub-load without first being conditioned, and wherein the solar photovoltaic system does not comprise a power storage device for the power output of the solar photovoltaic system or power conditioning electronics for the power output of the solar photovoltaic system.

2. The method of claim 1, wherein the first sub-load and the second sub-load have a fixed resistance value.

3. The method of claim 2, wherein the first sub-load and the second sub-load comprise an electrolytic tank.

4. The method of claim 1, wherein the first sub-load and the second sub-load have an identical resistance value.

5. The method of claim 1, wherein one of first sub-load or the second sub-load has a variable resistance value.

6. The method of claim 5, wherein one of the first sub-load or the second sub-load comprises a battery or an electric vehicle.

7. The method of claim 1, wherein the first sub-load and the second sub-load may be independently coupled to and uncoupled from the photovoltaic array responsive to a signal from the controller.

8. The method of claim 1, further comprising coupling a third sub-load, a fourth sub-load, a fifth sub-load, and a sixth sub-load to the photovoltaic array,
   wherein the first signal is generated by the controller responsive to determining, by the controller, a solar intensity on the photovoltaic array has reached 12.5% of a maximum solar intensity on the photovoltaic array,
   wherein the second signal is generated by the controller responsive to determining, by the controller, the solar intensity on the photovoltaic array has reached 25% of the maximum solar intensity on the photovoltaic array,
   wherein the third sub-load is coupled to the photovoltaic array responsive to determining, by the controller, the solar intensity on the photovoltaic array has reached 37.5% of the maximum solar intensity on the photovoltaic array,
   wherein the fourth sub-load is coupled to the photovoltaic array responsive to determining, by the controller, the solar intensity on the photovoltaic array has reached 50% of the maximum solar intensity on the photovoltaic array,
   wherein the fifth sub-load is coupled to the photovoltaic array responsive to determining, by the controller, the solar intensity on the photovoltaic array has reached 62.5% of the maximum solar intensity on the photovoltaic array, and
   wherein the sixth sub-load is coupled to the photovoltaic array responsive to determining, by the controller, the solar intensity on the photovoltaic array has reached 75% of the maximum solar intensity on the photovoltaic array.

* * * * *